(12) United States Patent
Kawanishi

(10) Patent No.: US 7,400,354 B2
(45) Date of Patent: **\*Jul. 15, 2008**

(54) CAMERA DEVICE AND SHOOTING METHOD

(75) Inventor: Isao Kawanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 640 days.

This patent is subject to a terminal disclaimer.

(21) Appl. No.: 11/093,335

(22) Filed: Mar. 29, 2005

(65) Prior Publication Data

US 2005/0231630 A1   Oct. 20, 2005

Related U.S. Application Data

(63) Continuation of application No. 09/794,972, filed on Feb. 27, 2001, now Pat. No. 6,879,345.

(30) Foreign Application Priority Data

Feb. 29, 2000   (JP) .......................... P2000-054254

(51) Int. Cl.
*H04N 5/235* (2006.01)
*G03B 7/00* (2006.01)

(52) U.S. Cl. ........................................ 348/362; 348/366

(58) Field of Classification Search ............ 348/333.03, 348/363, 362, 366
See application file for complete search history.

(56) References Cited

U.S. PATENT DOCUMENTS

| 5,101,276 | A | 3/1992 | Ohta |
| 5,339,163 | A | 8/1994 | Homma et al. |
| 5,353,058 | A | 10/1994 | Takei |
| 5,510,837 | A | 4/1996 | Takei |
| 5,703,644 | A | 12/1997 | Mori et al. |
| 5,880,782 | A | 3/1999 | Koyanagi et al. |
| 5,940,530 | A | 8/1999 | Fukushima et al. |
| 6,426,775 | B1 * | 7/2002 | Kurokawa .................... 348/363 |
| 6,480,226 | B1 | 11/2002 | Takahashi et al. |
| 6,690,424 | B1 | 2/2004 | Hanagata et al. |
| 6,694,051 | B1 * | 2/2004 | Yamazoe et al. ............. 382/167 |
| 7,071,987 | B1 * | 7/2006 | Tanaka ........................ 348/362 |

FOREIGN PATENT DOCUMENTS

| JP | 62110369 A | 5/1987 |
| JP | 02268080 A | 11/1990 |

* cited by examiner

*Primary Examiner*—Tuan Ho
*Assistant Examiner*—Trung Diep
(74) *Attorney, Agent, or Firm*—Frommer Lawrence & Haug LLP; William S. Frommer

(57) ABSTRACT

Backlight correction by the following steps. The location of a dark distribution is determined, and a dark distribution histogram ratio is calculated. Next, the location of a bright distribution is determined, and a high-brightness slice set value is set. A determination is made as to whether or not a subject is in a backlighted state. When the subject is not in a backlighted state, the high-brightness slice set value is used unchanged. On the other hand, when the subject is in a backlighted state, the dark_ratio is normalized so that, for example, backlight correction is carried out so that a high-brightness component limiter value of an integration signal of a peak-value-detected output is decreased.

1 Claim, 11 Drawing Sheets

FORMULA:
0xFF*(dark_ratio − 0xFB00) / (threshold VALUE (0xFF00) − 0xFB00)

| BACKLIGHT DETERMINING ON THRESHOLD | dark_ratio | NORMALIZED VALUE (D) | NORMALIZED VALUE (H) |
|---|---|---|---|
| FF00 | FB00 | 0 | 0 |
| FF00 | FB80 | 31.875 | 1F |
| FF00 | FC00 | 63.75 | 3F |
| FF00 | FC80 | 95.625 | 5F |
| FF00 | FD00 | 127.5 | 7F |
| FF00 | FD80 | 159.375 | 9F |
| FF00 | FE00 | 191.25 | BF |
| FF00 | FE80 | 223.126 | DF |
| FF00 | FF00 | 255 | FF |

FIG. 10

| NORMALIZED VALUE OF dark_ratio | FF ~F0 | EF ~E0 | DF ~D0 | CF ~C0 | BF ~B0 | AF ~A0 | 9F ~90 | 8F ~80 | 7F ~70 | 6F ~60 | 5F ~50 | 4F ~40 | 3F ~30 | 2F ~20 |
|---|---|---|---|---|---|---|---|---|---|---|---|---|---|---|
| AMOUNT OF SHIFT IN +DIRECTION | 00h | 00h | 00h | 00h | 01h | 02h | 03h | 04h | 05h | 06h | 07h | 08h | 09h | 0Ah |

SHIFTED IN + DIRECTION (columns BF~B0 through 2F~20)

CAMERA DEVICE AND SHOOTING METHOD

This is a continuation of application Ser. No. 09/794,972, filed Feb. 27, 2001, now U.S. Pat. No. 6,879,345, the entirety of which is incorporated herein by reference.

BACKGROUND OF THE INVENTION

1. Field of the Invention

The present invention relates to a camera device for performing a shooting operation by converting, for example, image light from a subject into an electrical signal using an image pickup device. More particularly, the present invention relates a camera device which makes it possible to automatically perform a predetermined backlight correction operation by detecting a backlighted state as a result of determining the ratio between the brightness level of a portion of-an imaging surface of the image pickup device having the lowest brightness level and the brightness level of a portion of the imaging surface of the image pickup device other than that of the portion having the lowest brightness level.

2. Description of the Related Art

Hitherto, a camera device which makes it possible to prevent the taking of underexposed photographs by performing an overexposing correcting operation when it is determined that a subject is in what is called a backlighted state has been known. The technology of such a camera device is disclosed, for example, in Japanese Unexamined Patent Publication No. 62-110369. In the invention which is disclosed in this document, the tendency of the main subject being positioned at the center of a screen with high probability is made use of. The imaging screen is divided into the center portion and the portions in the vicinity of the center portion. The brightness level of each portion is obtained in order to adjust the exposure by the ratio between that of the center portion and those of the portions in the vicinity, whereby the main subject at the center of the screen is suitably exposed.

More specifically, in the camera device, when the brightness of the subject at the center area of the imaging screen and the brightness of the subject at the vicinity of the center area are detected, and it is found that the brightness of the subject at the center area is less than the brightness of the subject at the vicinity of the center area by an amount equal to or greater than a predetermined value, a determination is made that the subject at the center area is in a backlighted state, so that an overexposing correcting operation is carried out during the shooting operation. When this is carried out, it is possible to prevent the mistake of taking a photograph in which the subject at the center area is squashed and appears black due to underexposure.

In addition, hitherto, a camera device for increasing an exposure standard value which is incorporated in the inside of the camera in order to perform an overexposing correcting operation when it is determined that the subject is backlighted is known. More specifically, in this camera device, a determination is made as to whether the level of an integration signal which is obtained when an output signal of, for example, an image pickup device (that is, a charge-coupled device (CCD)) passes through an optical detecting circuit (OPD) is smaller than or greater than the exposure standard value which is incorporated inside the camera. If it is greater, an underexposing correcting operation is carried out, whereas, if it is smaller, an overexposuring correcting operation is carried out. In the backlighted state, the exposure standard value is increased to perform the overexposing correcting operation. When this is done, it is possible to prevent the mistake of taking a photograph in which the subject at the center area is squashed and appears black due to underexposure.

Further, in recent years, a camera exposure control device has been disclosed in Japanese Unexamined Patent Publication No. 2-268080. In this device, in order to obtain a proper photometric value, a plurality of high-brightness clip circuits having different clip levels are provided. The device makes use of brightness signals which pass through the high-brightness clip circuits having clip levels in accordance with shooting scenes. According to this device, when a determination is made that the shooting scene is backlighted, the brightness signal of the subject is input through a high-brightness clip circuit having a low clip level in order to determine the photometric value. By adjusting the aperture of the iris diaphragm so that the photometric value is equal to the standard value, the mistake of taking a picture in which the subject at the center area is squashed and appears black due to underexposure is prevented from occurring.

In the method of performing an overexposing correcting operation by increasing the exposure standard value as described above, when, for example, a moving subject, such as an automobile, is to be photographed, the exposure standard value is increased and decreased many times under the environment in which determinations that the subject is backlighted and determinations that the subject is not backlighted are mixed. Therefore, it may be necessary to think of ways to prevent unstable exposure controlling operations, such as by performing a delaying operation.

On the other hand, in the method where the high-brightness component level of an integration signal (which is obtained after the output signal of the image pickup device (CCD) has passed through the optical detecting circuit (OPD)) is continuously previously measured in order to continuously change the high-brightness clip level in accordance with the degree of backlighting, the level of the integration signal of the optical detecting circuit (OPD) becomes smaller the more the clipping operation is performed. Accordingly, as the exposure controlling operation, an overexposing controlling operation is carried out as in the case where a determination that the amount of light incident upon the image pickup device (CCD) is small is made. Here, as shown in FIG. 11, it is not necessary to increase or decrease the exposure standard value, so that the conventional exposure controlling operation can be made use of as it is, making it possible to correspondingly maintain the reliability of the system.

However, in the method where the brightness of the subject at the center area and that of the subject in the vicinity thereof are compared as described above, when the main subject is located at both the center area and the vicinity of the center area of the screen, a difference between the brightness at the center area and that at the vicinity of the center area is decreased. Therefore, exposure correction may not be carried out because it sometimes cannot be determined that the subject is in a backlighted state even if it is in a backlighted state. In that case, the main subject is underexposed.

In addition, the main subject is not always at the center area of the screen. When it is at the vicinity of the center area and is backlighted, the brightness of the subject at the vicinity is lower than the brightness of the subject at the center area. Therefore, exposure correction may not be carried out because it sometimes cannot be determined that the subject is in a backlighted state even if it is in a backlighted state. In that case, the main subject is also underexposed.

SUMMARY OF THE INVENTION

In view of the above-described problems, the present invention tries to overcome the problem that proper backlight correction cannot be carried out in conventional devices. For example, as discussed above, when the main subject is at the vicinity of the center area, it sometimes cannot be determined that the subject is in a backlighted state even if it is in a backlighted state. In that case, the main subject is underexposed because proper exposure correction is not carried out.

Accordingly, in the present invention, the bright and dark distributions on an imaging screen are detected, and, from the bright distribution, the peak value of the brightness signal is detected. Based on the degree of darkness of the dark distribution, a high-brightness component limiter value of an integration signal of a peak-value-detected output of an optical detecting circuit (OPD) is decreased. Here, a shooting state which is like a shooting state which is created when the quantity of light incident upon an image pickup device (CCD) is small is created in order to perform an overexposing operation (that is, a rather bright exposure correcting operation), causing the screen to become bright, so that the effectiveness with which backlight correction is carried is increased.

According to the present invention, there is provided a camera device for performing a shooting operation by converting image light into an electrical signal using an image pickup device. The camera device comprises means for setting detection frames based on a division of an imaging surface of the image pickup device into a plurality of portions, means for detecting the brightness level with every set detection frame, and means for calculating the ratio between the brightness level detected from the detection frame having the lowest detected brightness level and the average value of the brightness levels detected from the detection frames other than the detection frame having the lowest brightness level. In the camera device, when the obtained ratio is equal to or greater than a predetermined value, a determination is made that it is a backlighted state, so that a correcting operation is performed.

According to the present invention, when the degree of darkness of the dark distribution is large, it is determined that the subject is in a backlighted state. The high-brightness component limiter value of the integration signal of the peak-value-detected output of the optical detecting circuit (OPD) is reduced in order to create a shooting state like a shooting state which is created when the quantity of light incident upon the image pickup device (CCD) is small, making it possible to perform an overexposing operation (that is, a rather bright exposure correcting operation). Therefore, nothing needs to be done to the system which controls the exposure in accordance with how large or small the quality of light incident upon the image pickup device (CCD) is. Consequently, the conventional system can be used as it is. Since it is not necessary to add complicated functions to the functions of the exposure calculating system, it is possible to maintain the reliability of the system.

BRIEF DESCRIPTION OF THE DRAWINGS

FIG. 10 is a diagram used to illustrate the shifting of a histogram standard value during a backlight correcting operation.

DESCRIPTION OF THE PREFERRED EMBODIMENT

Figure 1:
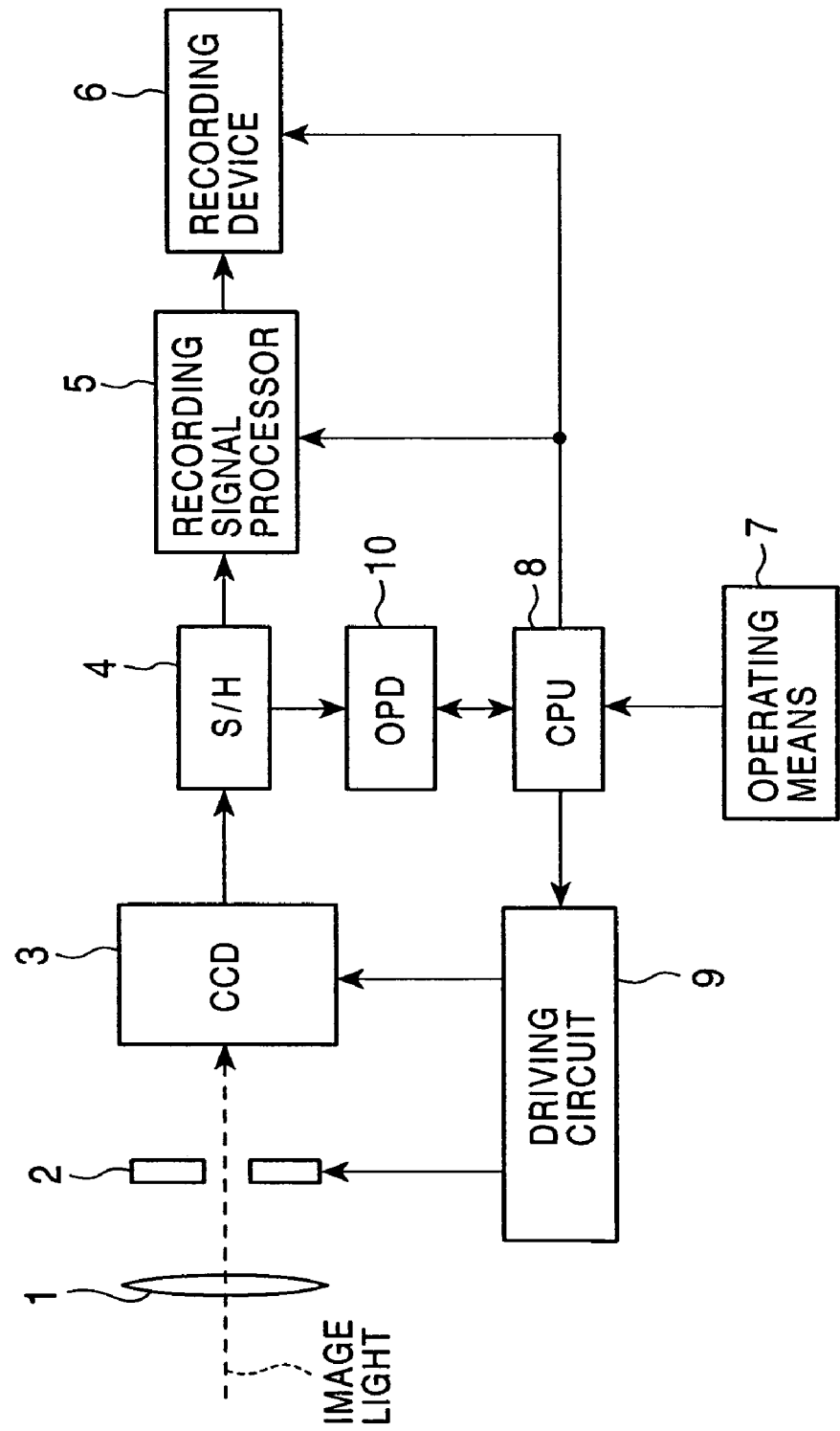
FIG. 1 is a block diagram of the structure of an embodiment of a camera device to which the present invention is applied.

Hereunder, the present invention will be described with reference to the drawings. FIG. 1 is a block diagram of the structure of an embodiment of a camera device to which the present invention is applied.

In FIG. 1, image light (which is represented by a broken line) from a subject (not shown) is incident upon an image pickup device (that is, a charge-coupled device (CCD)) 3 through a lens system 1 and a diaphragm means 2. An imaging signal which is formed in accordance with an image which is formed at an imaging surface of the image pickup device 3 is supplied to a sample hold (S/H) circuit 4 in order to take out a desired image signal. Then, this signal is supplied to an optical detecting circuit (OPD) 10 in order to take out signals such as an integration signal and a brightness level signal, which are required for various processing operations. Thereafter, the image signal which has been taken out from the sample hold circuit 4 is supplied to a recording signal processor 5, and is formed into a predetermined recording signal. The recording signal is supplied to a recording device 6, and is recorded onto any recording medium (not shown).

A signal from any type of operating means 7 is supplied to a microcomputer (that is, a center processing unit (CPU)) 8 used for controlling the system. A control signal from the microcomputer 8 is supplied to the recording signal processing circuit 5 and the recording device 6 in order to control the recording of the image signal which has been taken out from the sample hold circuit 4 onto the recording medium (not shown). In addition, the signals such as the brightness level signal and the integration signal, which have been taken out from the optical detecting circuit (OPD) 10, are supplied to the microcomputer 8 in order to determine the content of the image signal which has been subjected to the imaging operation. Then, a control signal which is formed in accordance with the determined content is supplied to a driving circuit 9 which is used to adjust the diaphragm means 2 and the exposure time (that is, the shutter speed) at the image pickup device 3.

Figure 2:
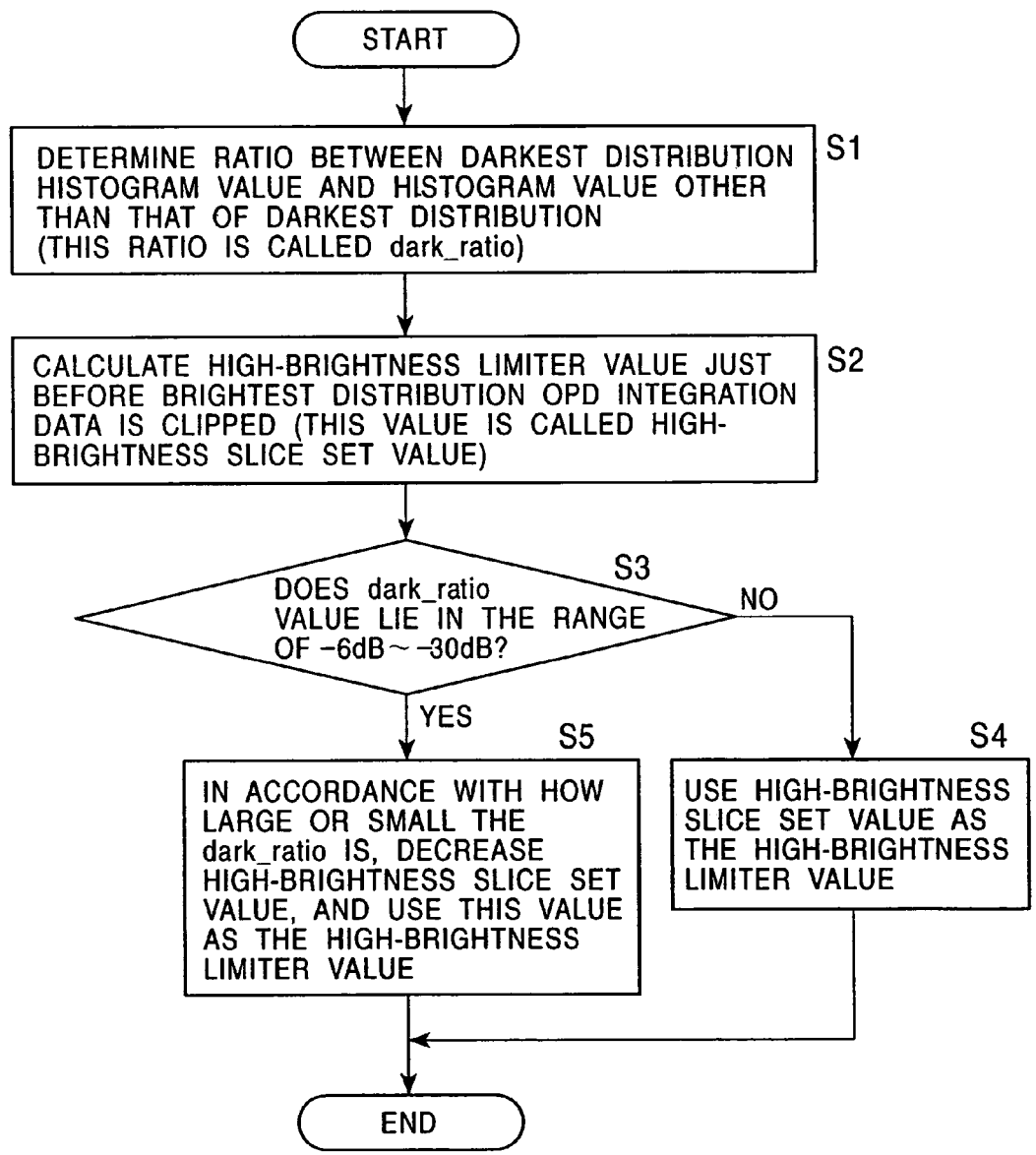
FIG. 2 is a simplified flowchart used to illustrate the operation of the camera device.
Figure 3:
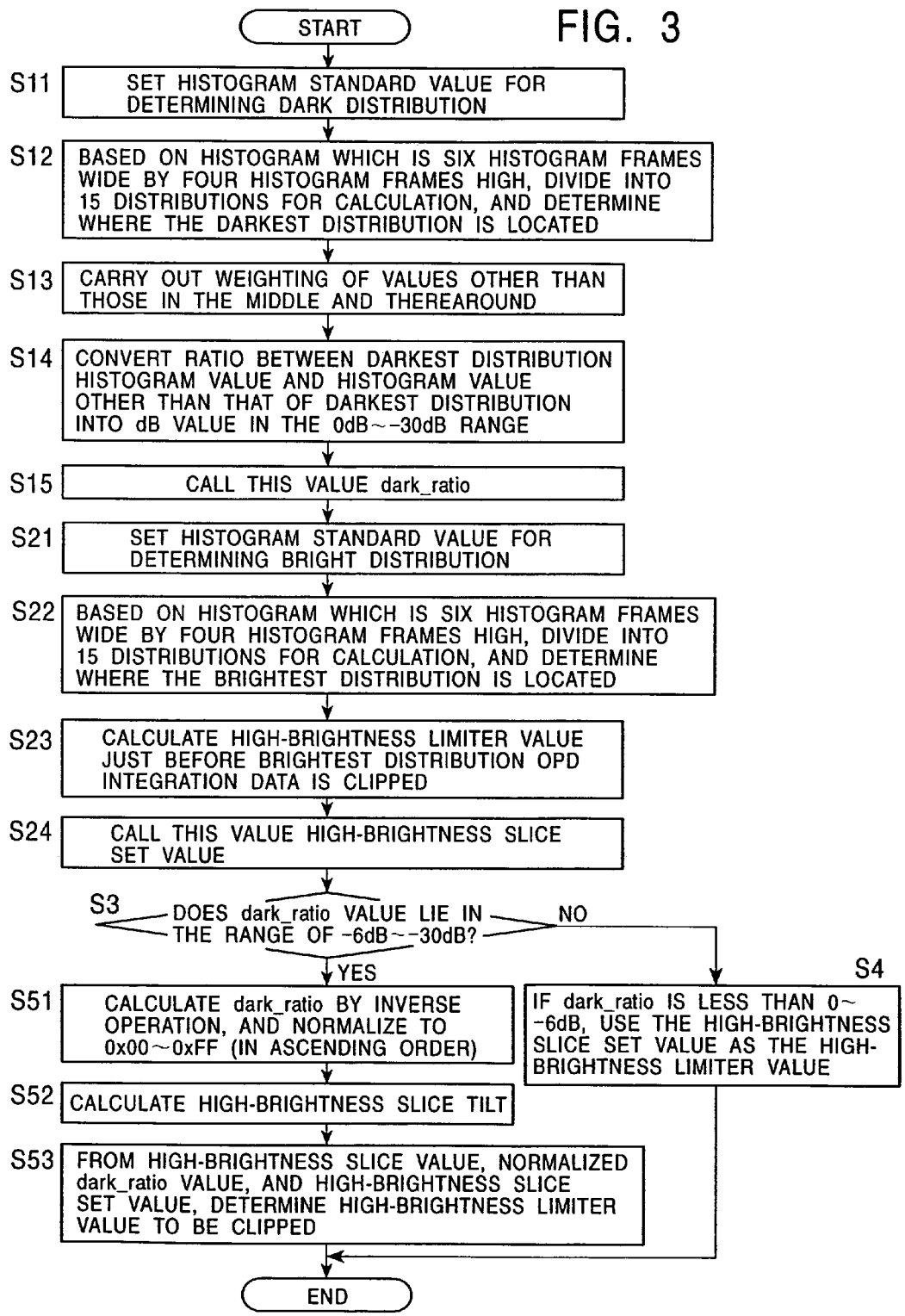
FIG. 3 is a detailed flowchart used to illustrate the operation of the camera device.

In the camera device, the processing operations for carrying out the aforementioned backlight correction are performed as illustrated in the flowcharts shown in FIGS. 2 and 3. FIG. 3 is a flowchart used to illustrate the operation of a backlight correcting device used in the embodiment of the camera of the present invention. FIG. 2 is a flowchart which is a summarized form of the flowchart of FIG. 3, in which the processing operations are roughly divided into five processing operations.

When the processing is started, the location of a dark distribution is determined and a dark distribution histogram ratio is calculated in Step 1 shown in FIG. 2. More specifically, a histogram standard value for determining the dark distribution is set in the first step 11 shown in FIG. 3. Here, the term histogram refers to the ratio of the area of the portion within the screen which is brighter than the standard value. The determination of the location of the dark distribution involves the detection of the distribution in which the area where the histogram values are greater than the standard value within the screen is smallest. The histogram standard value for determining the dark distribution is set such that it is adjusted to a location where there is a high probability that the area where the histogram values are greater than the standard value will be equal to or less than one-third of the total area.

Figure 4:
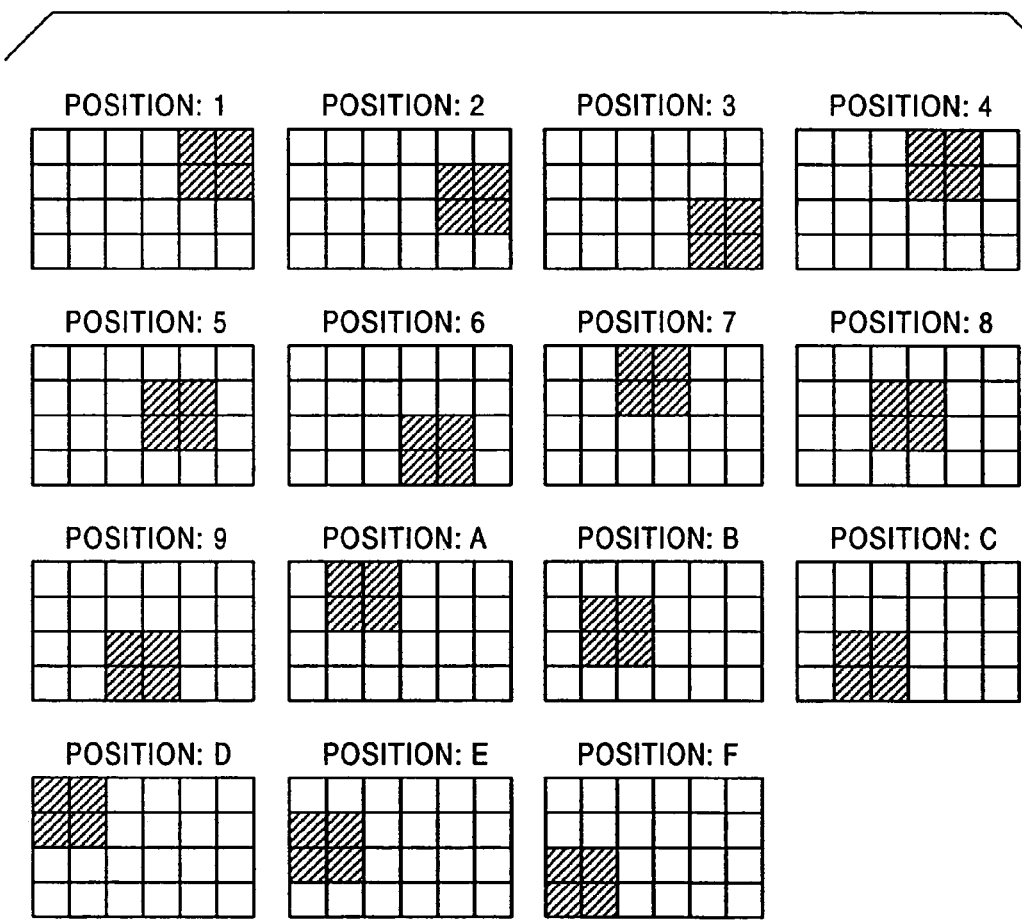
FIG. 4 is a diagram used to illustrate histogram frames.

In Step 12, the location of the darkest distribution is detected. Here, a histogram consisting of histogram frames for determining the dark distribution is, for example, six histogram frames wide by four histogram frames high as shown in FIG. 4. However, any number of histogram frames may be used in the horizontal and vertical directions. If the histogram has at least one histogram frame in the vertical and horizontal directions, the same processing operations can be carried out as when the histogram which is six histogram frames wide by four histogram frames high is used. In that case, in order to simulate the processing operations using, for example, the histogram which is six histogram frames wide by four histogram frames high, a process is made to successively move the histogram frame whose horizontal length is one-sixth of the entire length and whose vertical length is one-fourth of the entire length in a 24 clock period so as to move once within the screen.

In the actual processing, based on, for example, the histogram which is six histogram frames wide by four histogram frames high, the histogram values are calculated by dividing into 15 distributions as represented, for example, by positions 1 to F in FIG. 4 in order to determine the location of the darkest distribution. Here, the histogram values of the darkest distribution and the histogram values of the distributions other than that of the darkest distribution are called hst_dark_target values and hst_dark_nontarget values, respectively. Here, in order to make it possible to compare the histogram values (hst_dark_nontarget values) other than those of the darkest distribution and the histogram values (hst_dark_target values) of the darkest distibution in terms of the same area, the average values thereof obtained after divided by their corresponding areas are used.

After the histogram values have been obtained, the hst_dark_target values obtained from among each of the distributions are subjected to weighting operations in Step 13. The purpose of Step 13 is to increase the hst_dark_target values of the portions other than those of the center portion and portions in the vicinity of the center portion in order to decrease the ratio of the dark distribution, as a result of which an overexposing correcting amount is decreased. In other words, the purpose thereof is to weaken the effect of the backlight correcting operation by decreasing the overexposing correcting amount when the portions other than the center portion and the portions in the vicinity of the center portion are dark, so that a dark_diff number which is discussed later does not become small.

More specifically, the position numbers shown in FIG. 4 are separated into those which correspond to the positions which are to be subjected to backlight correction (that is, positions 2, 5, 6, 8, 9, B, C, and E) and those which correspond to the positions which are not to be subjected to backlight correction (that is, positions 1, 3, 4, 7, A, D, and F).

At the positions which are to be subjected to backlight correction, weighting operations using the expression hst_dark_target×10h/10h (weighting value:1×)) are carried out.

At the positions which are not to be subjected to backlight correction, weighting operations using the expression hst_dark_target×set value A/10h (when the set value A is 15h, the weighting value is 1.3×). h represents a hexadecimal number.

Next, in Step 14, the ratio between the hst_dark_target values and the hst_dark_nontarget values is calculated using the following expression:

$$dark\_diff = hst\_dark\_target \times 100h / hst\_dark\_nontarget$$

100h is included in the expression because numbers which are handled by a controlling software are hexadecimal numbers. 100h is included for the purpose of preventing the result from always becoming zero when the numerator is small, and for making 100h the center value (that is, zero).

Thereafter, in Step 15, the obtained dark_diff_number is converted into a dB value which falls within the range of from 0 dB to −30 dB. The converted value is called the dark_ratio value. This is the dark distribution ratio.

After executing Step 15, the location of a bright distribution is determined and a high-brightness slice level setting operation is carried out in Step 2 shown in FIG. 2. More specifically, a histogram standard value for determining the bright distribution is set in Step 21 shown in FIG. 3. The determination of the location of the bright distribution involves the detection of the distribution in which the area where the histogram values are greater than the standard value within the screen is largest. This corresponds to the fact that the distribution in which the area where the histogram values are greater than the standard value is smallest is a dark distribution. The histogram standard value for determining the bright distribution is set so as to be adjusted to a level where there is a high probability that the area where the histogram values are greater than the standard value is about one-third of the entire area.

In Step 22, the location of the brightest distribution is detected. Here, the histogram consisting of histogram frames used for determining the bright distribution is, for example, six histogram frames wide by four histogram frames high as shown in FIG. 4. However, any number of histogram frames may be used in the horizontal and vertical directions. If the histogram has at least one histogram frame in the vertical and horizontal directions, the same processing operations can be carried out as when the histogram which is six histogram frames wide by four histogram frames high is used. In that case, in order to simulate processing operations using, for example, the histogram which is six histogram frames wide by four histogram frames high, a process is made to successively move a histogram frame whose horizontal length is one-sixth of the entire length and whose vertical length is one-fourth of the entire length so as to move once within the screen in a 24 clock period.

In the actual processing, based on, for example, the histogram which is six histogram frames wide by four histogram frames high, the histogram values are calculated by dividing into 15 distributions as represented, for example, by positions 1 to F in FIG. 4 in order to determine the location of the brightest distribution. Then, in Step 23, an integration frame having the same area as the histogram frame having the brightest distribution which has been determined in the above-described manner is set at the same location as a histogram frame having the brightest distribution. The setting of the integration frame is performed with respect to the optical detecting circuit (OPD) 10 by the control signal from the microcomputer (CPU) 8.

Figure 5:
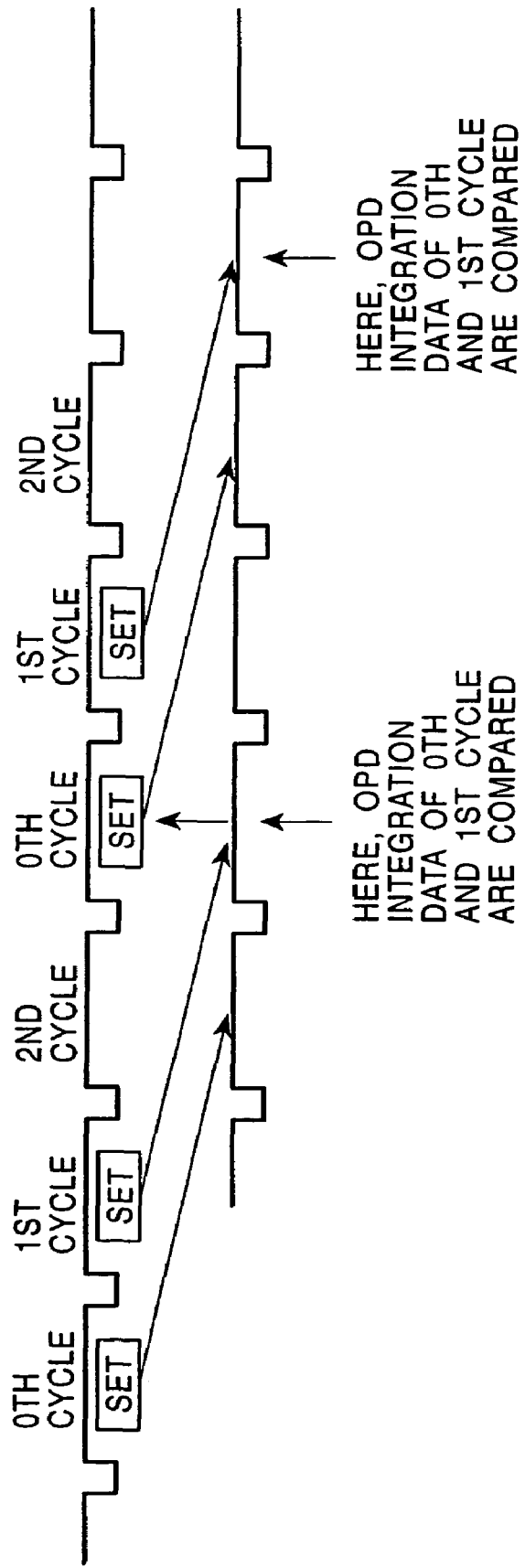
FIG. 5 is a diagram used to illustrate a high-brightness slice level setting operation.

Thereafter, in Step 24, an integration output signal of the optical detecting circuit (OPD) 10 from the integration frame is obtained while changing the high-brightness slice set value. The setting of the high-brightness slice level means limiting the high-brightness component of the integration signal, so that the more the high-brightness component is controlled, the lower the level of the integration signal becomes. Here, the setting of the high-brightness slice level is changed in, for example, three clock periods as shown in FIG. 5. More specifically., if the three clock periods are defined in terms of cycle periods, they can be called a zeroth cycle, a first cycle, and a second cycle, which are defined, for example, as described below.

In the zeroth cycle, a high-brightness slice set value which is less by a predetermined value than a high-brightness slice set value which is set in the next first cycle is set.

In the first cycle, a high-brightness slice set value (which is greater by a predetermined value than the high-brightness slice set value set in the zeroth cycle) is set.

The second cycle is a non-operation cycle.

If, in the next set of zeroth and first cycles, there is a difference between integration data from the optical detecting circuit (OPD) which reflects the high-brightness slice set value of the zeroth cycle which is less by a predetermined value and integration data from the optical detecting circuit (OPD) which reflects the high-brightness slice set value of the first cycle, the high-brightness slice set value is increased. Otherwise, the high-brightness slice set value is decreased until a difference is produced.

Figure 6A:
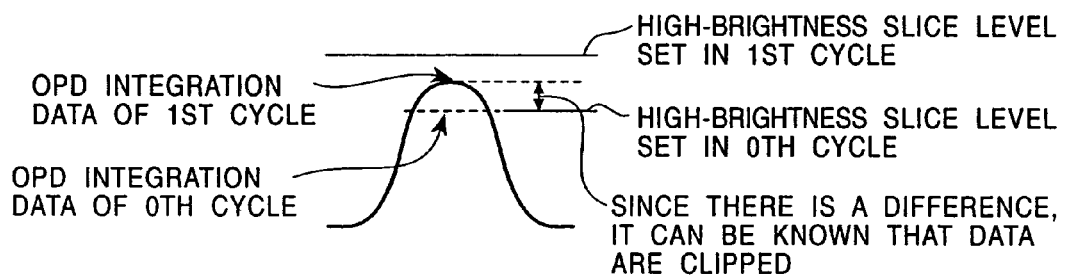
FIGS. 6A and 6B are diagrams used to illustrate the high-brightness slice level setting operation.
Figure 6B:
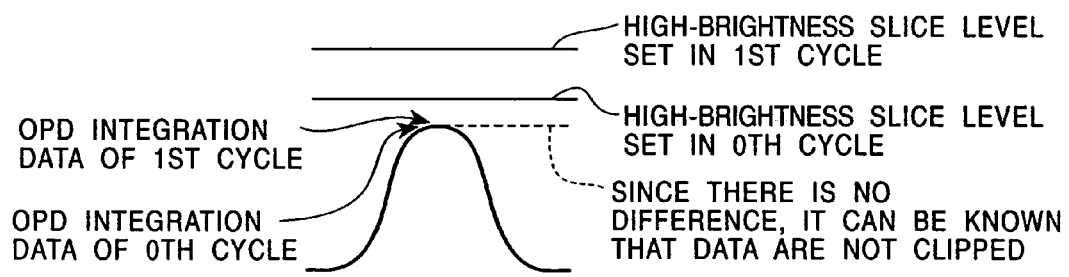

The points of the operation are as shown in FIGS. 6A and 6B.

In other words, as shown in FIG. 6A, if the value of the integration data from the optical detecting circuit (OPD) 10 set in the zeroth cycle is less than the value of the integration data from the optical detecting circuit (OPD) 10 set in the first cycle, a determination is made that the integration data from the optical detecting circuit (OPD) 10 are clipped, so that the high-brightness slice set values are increased.

On the other hand, if, as shown in FIG. 6B, the value of the integration data from the optical detecting circuit (OPD) 10 which has been set in the zeroth cycle is equal to or greater than the value of the integration data from the optical detecting circuit (OPD) 10 which has been set in the first cycle, a determination is made that the integration data from the optical detecting circuit (OPD) 10 are not clipped, so that the high-brightness slice set values are decreased. In this way, by the slice set values which are set in the zeroth and first cycles, a high-brightness slice set value just before the slicing of the integration data from the optical detecting circuit (OPD) 10 is started is obtained.

In Step 3 shown in FIGS. 2 and 3, a backlight determining operation is carried out. Here a backlight determining means determines that a subject is not in a backlighted state when the dark_ratio value described in the part of the specification which describes Step 1 (in which the location of the dark distribution is determined and the dark distribution histogram ratio is calculated) falls within the range of from 0 dB to less than −6 dB, whereas it determines that the subject is in a backlighted state when the dark-ratio value falls within the range of from 6 dB to −30 dB. In other words, a dark_diff-number of FF00h corresponds to a value of −6 dB. When, for example, the dark_diff-number falls within the range of from 0000h to FF00h, the backlight determining means determines that the subject is not in a backlighted state, whereas, when the dark_diff-number falls in the range of from FF00h to FB00h, the backlight determining means determines that the subject is in a backlighted state. The threshold value of FF00h=−6 dB is changeable.

When, in Step 3, the backlight determining means determines that the subject is in a backlighted state, the high-brightness slice set value which has been discussed in the part of the specification describing Step 2 (in which the location of the bright distribution is determined and a high-brightness slice set value is set) is used as a high-brightness limiter value of the integration signal for the optical detecting circuit (OPD) 10 in Step 4 shown in FIGS. 2 and 3, and is sent to the optical detecting circuit (OPD) 10. In contrast, when, in Step 3, the backlight determining means determines that the subject is not in a backlighted state, the dark_ratio value is normalized in Step 5 shown in FIG. 2.

Figure 7:
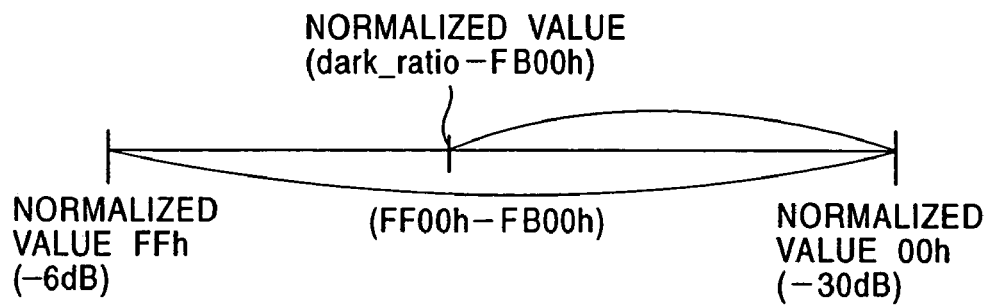
FIG. 7 is a diagram used to illustrate a normalizing operation of a dark_ratio value.

More specifically, in Step 51 shown in FIG. 3, the dark_ratio value is calculated by inverse operation, and the range from FB00h (−30 dB) to FF00h (−6 dB) is normalized to a range from 00h to FFh. The formula for this calculation is as shown, for example, in FIG. 7:

$$\text{normalized dark\_ratio} = FFh * (\text{dark\_ratio} - FB00h) / (\text{threshold value}(FF00h) - FB00h)$$

In Step 52, a high-brightness slice tilt value is calculated. Here, the tilt value for clipping a high-brightness slice set value (which has been discussed in the part of the specification describing Step 2 in which the location of the bright distribution is determined and a high-brightness slice set value is set) is calculated based on the normalized dark_ratio. In the slice set value range of from 00h to FFh, the tilt value is calculated using the following formula:

$$\text{tilt value} = \text{slice set value} \times \text{slice set value} / FFh.$$

Figure 8:
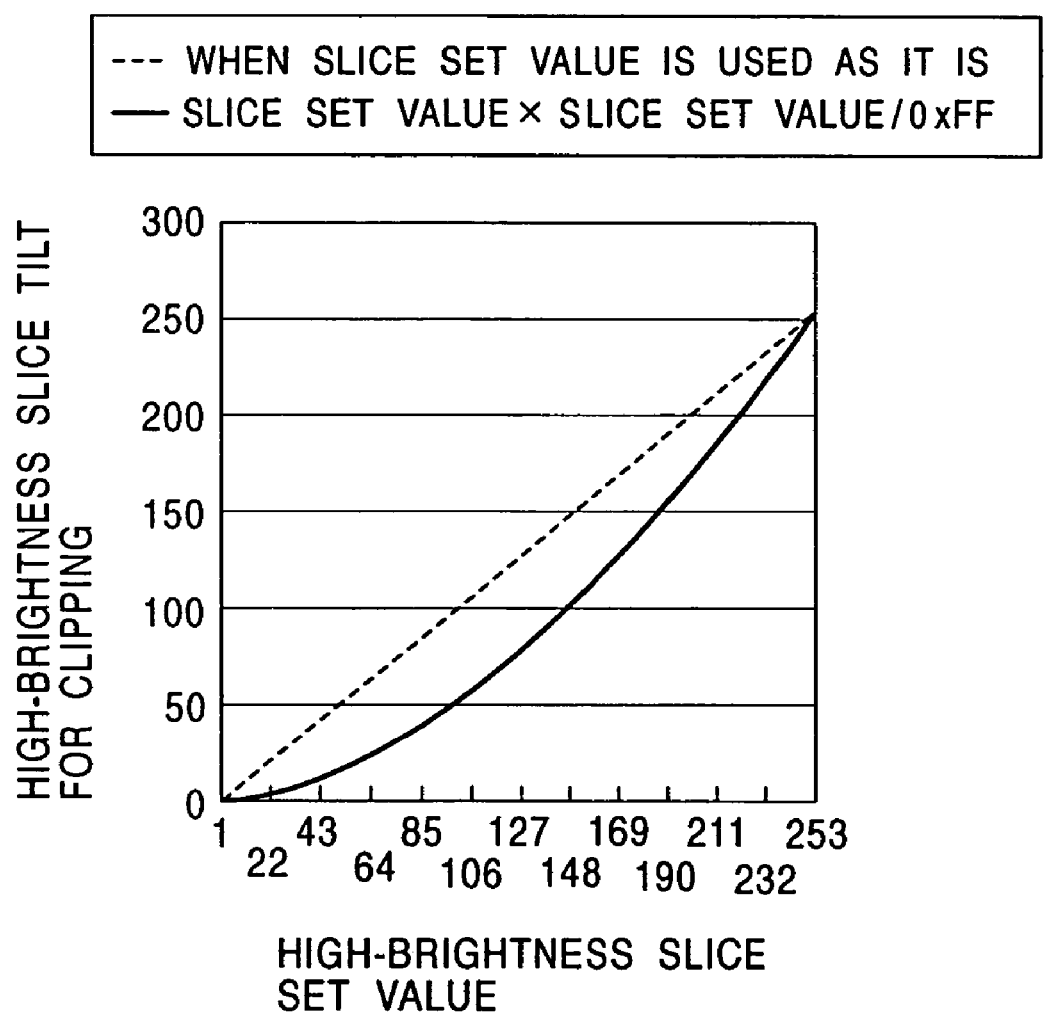
FIG. 8 is a diagram which illustrates the tilt for clipping a high-brightness slice set value.

This makes it possible to obtain a tilt such as a tilt (which is represented by line A) shown in FIG. 8.

In Step 53, the high-brightness limiter value is calculated. Here, from the high-brightness slice tilt value, the normalized value of the dark_ratio, and the high-brightness slice set value, the high-brightness limiter value for clipping is calculated. The high-brightness limiter value is determined using the following formula:

$$\text{slice tilt value} + (\text{slice set value} - \text{slice tilt value}) \times \text{normalized dark\_ratio value} / FFh$$

Figure 9:
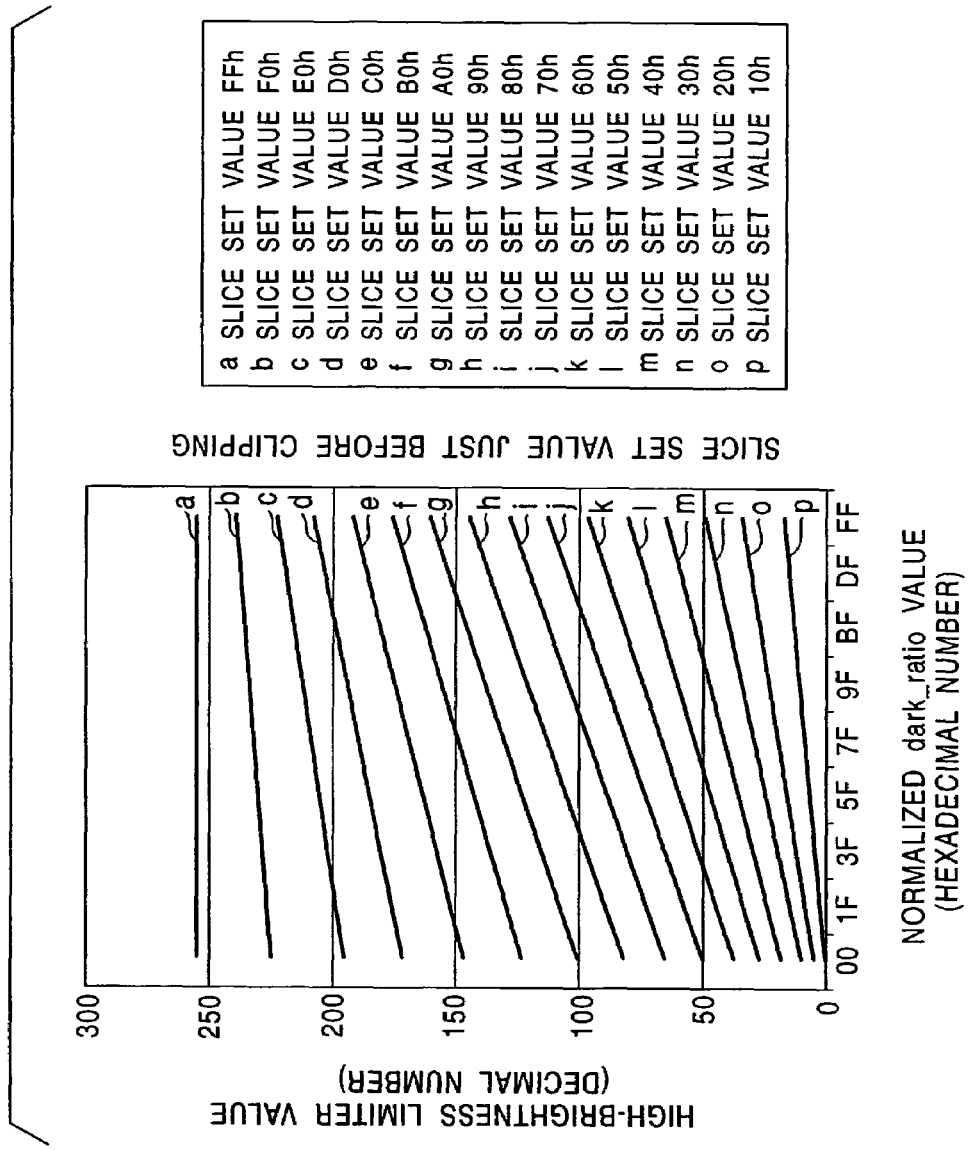
FIG. 9 is a diagram which illustrates the relationship between a normalized dark_ratio value, a high-brightness slice set value, and a high-brightness limiter value.
Figure 11:
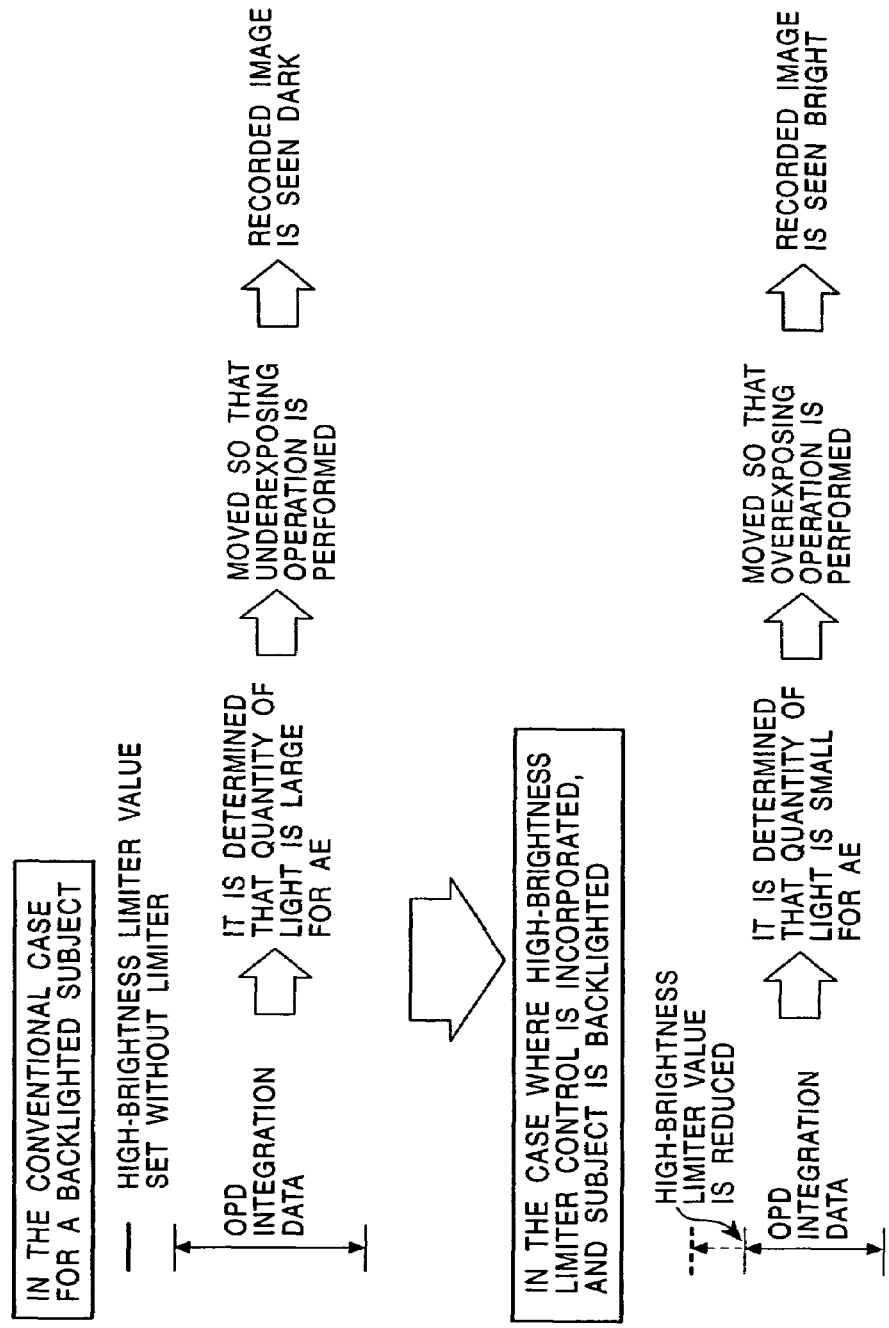
FIG. 11 is a diagram used to illustrate an exposure correcting operation.

The relationship between the normalized value of the dark_ratio, the high-brightness slice set value, and the high-brightness limiter value for clipping is illustrated in FIG. 9.

In this way, the locations of the bright and dark distributions on the imaging screen are detected in order to detect the peak value of the brightness signal from the bright distribution. Based on the degree of darkness of the dark distribution, backlight correction is carried out so as to reduce the high-brightness limiter value of the integration signal of the peak-value-detected output of the optical detecting circuit (OPD), whereby the processing is completed. This results in an effective, good exposure controlling operation even for shooting scenes where the main subject is not assumed to be at the center of the screen.

During the backlight correction, the high-brightness limiter value is reduced, so that the brightness is increased correspondingly by the overexposing correcting operation, causing the dark distribution histogram ratio to be reduced. If this state continues, the backlight determining means determines that the subject is not in a backlighted state, causing the high-brightness limiter value to increase, thereby decreasing the effect. To overcome this problem, as shown in FIG. 10, during the backlight correction, the histogram standard value for determining the dark distribution which is in accordance with the normalized dark-ratio value is such as to be shifted towards the plus direction in order to stabilize the dark distribution histogram ratio.

Further, even if the above-described device determines that the subject is in a backlighted state using the dark_ratio value, the aforementioned device is made not to determine that the subject is in a backlighted state unless the f-number of the iris diaphragm or the exposure value (EV value) resulting from the combination of the iris diaphragm and the shutter speed reaches a corresponding value sufficient to carry out the backlight correction.

There are two reasons for this. The first reason is that, when the f-number of the iris diaphragm or the exposure value (EV value) resulting from the combination of the iris diaphragm and the shutter speed is close to the overexposure limit (at the location where the iris diaphragm is open or at the location where the shutter speed is lowest), the width of the overexposing correcting amount when the backlight determining means determines that the subject is in a backlighted state becomes narrow, so that the backlight correction becomes effective only when the gain of a video signal amplifier is increased.

More specifically, the phrase "the width of the correction amount is narrow" means that the overexposing correcting amount is small other than when the gain of the video signal amplifier is increased, so that, in terms of the f-number of the iris diaphragm or the combination of the iris diaphragm and the shutter speed, the subject cannot be made brighter unless the gain of the video signal amplifier is increased.

In an actual digital still camera or video camera, even if the f-number of the iris diaphragm or the exposure value (EV value) resulting from the combination of the iris diaphragm and the shutter speed reaches a corresponding overexposure limit (at the location where the iris diaphragm is open or at the location where the shutter speed is lowest), further overexposure can be achieved by increasing the gain of the video signal amplifier. However, it is known that, when the gain is increased, the S/N (signal-to-noise) ratio is correspondingly made unsuitable.

Accordingly, unless the f-number of the iris diaphragm or the exposure value (EV value) resulting from the combination of the iris diaphragm and the shutter speed reaches a value which is sufficient to perform backlight correction, the above-described device is made not to determine that the subject is in a backlighted state. This means that the gain of a video signal amplifier is not increased, so that the S/N (signal-to-noise) ratio of the video signal is not made unsuitable.

The values which are sufficient for performing backlight correction refer to an f-number (of the iris diaphragm) equal to or greater than f3 and an EV value (resulting from the combination of the iris diaphragm and the shutter speed) equal to or greater than −3 EV. However, these values are not absolute values so that other values may be used in accordance with the conditions.

The second reason is that, in a general shooting operation carried out indoors, there is almost no environmental condition which gives rise to a backlighted state, so that the necessity of backlight correction is low. Accordingly, a determination is made as to whether the shooting operation is carried out indoors or outdoors in the following way. Using the f-number of the iris diaphragm or the exposure value (EV value) resulting from the combination of the iris diaphragm and the shutter speed, when either value is a sufficient value, it is determined that the shooting operation is carried out outdoors, and, when it is determined that the subject is in a backlighted state, it is determined that the overexposing correcting amount is sufficient.

In other words, when the f-number of the iris diaphragm or the exposure value (EV value) resulting from the combination of the iris diaphragm and the shutter speed is a sufficient value, the fact that the outside is generally brighter than the inside is made use of in order to make it possible to determine that the shooting operation is being carried out outdoors if the exposure value (EV value) is equal to or greater than a predetermined value. Although this predetermined value varies with the seasons, time period, and shooting environment, and the like, it is, here, set at a value equal to a greater than a certain value. For example, it may be set equal to or greater than a color temperature of 3200 K. This certain value is not an absolute value so that it can be changed in accordance with the conditions.

Accordingly, the backlight determining means makes a determination based on the aforementioned dark ratio value, and the f-number of the iris diaphragm or the exposure value (EV value) resulting from the combination of the iris diaphragm and the shutter speed.

Accordingly, in the embodiment, the locations of the bright and dark distributions on the imaging screen are detected, and the peak value of the brightness signal is detected from the brightness distribution. Based on the degree of darkness of the dark distribution, by decreasing the high-brightness component limiter value of the integration signal of the peak-value-detected output of the optical detecting circuit (OPD), a shooting state which is like a shooting state in which the amount of light incident upon the image pickup device (CCD) is small is created, making it possible to perform the overexposing correcting operation (that is, perform a rather bright exposure correcting operation). This makes the screen brighter, making it possible to increase the effectiveness with which backlight correction is carried out.

In conventional devices, when the main subject is located at the vicinity of the center area, it may not be able to determine that the subject is in a backlighted state even when it is in a backlighted state. In that case, proper backlight corrections cannot be carried out, for example, the main subject is underexposed because a proper exposure correction is not carried out. However, according to the device of the present invention, such problems are easily solved.

The present invention is not limited to the above-described embodiment, so that various modifications may be made without departing from the spirit of the present invention.

As can be understood from the foregoing description, according to the backlight correction system used in the present invention, the high-brightness component level of the integration value which has been obtained after an output signal of the image pickup device (CCD) has passed through the optical detecting circuit (OPD) is previously measured. Then, by calculating the ratio between the bright distribution and the dark distribution, the degree of backlighting is determined in order to successively vary the high-brightness clip level. Thereafter, a proper exposure controlling operation is carried out so that the proper measured value is obtained at the backlighted scene, or a proper exposure controlling operation is carried out with respect to the shooting scenes other than backlighted scenes.

In one form of the present invention, the means for detecting the brightness level with every set detection frame determines the detection frame having the lowest brightness level by moving among the set detection frames. Therefore, the means can perform a detecting operation when there is at least one histogram frame, so that the structure can be simplified.

In another form of the present invention, the camera device further comprises exposure correcting means for performing an exposure correcting operation using a peak value of an integration signal of the brightness level of an image signal which has been subjected to an imaging operation at the image pickup device. In the camera device, the correcting operation which is carried out when the determination is made that it is a backlighted state is performed by limiting a high-brightness component of the image signal. Therefore, as an exposure controlling operation, an overexposing controlling operation like a controlling operation which is carried out when the quantity of incident light is small is carried, so that it is not necessary to increase or decrease the exposure standard value. Consequently, a conventional exposure controlling operation can be utilized, making it possible to correspondingly maintain the reliability of the system.

In still another form of the present invention, the camera device further comprises exposure correcting means for performing an exposure correction operation using a peak value of an integration signal of the brightness level detected from the detection frame having the highest detected brightness level. In the camera device, the correcting operation which is carried out when the determination is made that it is a backlighted state is performed by limiting a high-brightness component of the detected brightness level. Therefore, even for shooting scenes in which the main subject is not assumed to be at the center of the screen, an effective, good exposure controlling operation is carried out.

In still another form of the present invention, when the camera device further comprises exposure correcting means for performing an exposure correction operation using a peak value of an integration signal of the brightness level detected from the detection frame having the highest detected brightness level, and the correcting operation which is carried out when the determination is made that it is a backlighted state is performed by limiting a high-brightness component of the detected brightness level, the means for detecting the brightness level with every set detection frame may determine the detection frame having the highest brightness level by moving among the set detection frames. Therefore, the means can perform a detecting operation when there is at least one histogram frame, making it possible to simplify the structure.

In still another form of the present invention, when the camera device further comprises exposure correcting means for performing an exposure correction operation using a peak value of an integration signal of the brightness level detected from the detection frame having the highest detected brightness level, and the correcting operation which is carried out when the determination is made that it is a backlighted state is performed by limiting a high-brightness component of the detected brightness level, a weighting operation is carried out between the brightness levels detected from the center detection frame and the detection frames in the vicinity of the center detection frame of the imaging surface of the image pickup device and the brightness levels detected from the other detection frames. In addition, when the detection frame having the highest detected brightness level is located at the center and the vicinity of the center of the imaging surface of the image pickup device, the correcting operation which is carried out when the determination is made that it is a backlighted state is performed to a lesser degree by reducing the limiting operation of the high-brightness component of the detected brightness level. Therefore, when other than the center portion or the portion in the vicinity of the center portion are dark, the amount of overexposing correction is made small, so that the backlight correction becomes less effective.

In still another form of the present invention, the detection of the brightness level with every set detection frame is carried out using a histogram which indicates the ratio of the area where the brightness levels within the detection frames are greater than a standard value. Therefore, the detection of the brightness levels can be properly carried out.

In still another form of the present invention, the camera device further comprises exposure correcting means which incorporates at least a function of adjusting a diaphragm and a shutter speed. In the camera device, the correcting operation which is carried out when the determination is made that it is a backlighted state is carried out only when an adjustment value of the diaphragm and/or the shutter speed at the exposure correcting means is a value which allows the correcting operation to be carried out. Therefore, the gain of a video signal amplifier is not increased, so that the problem that the S/N (signal-to-noise) ratio of the video signal becomes an unsuitable value does not occur.

In still another form of the present invention, the camera device further comprises exposure correcting means which incorporates at least a function of adjusting a diaphragm and a shutter speed. In the camera device, the correcting operation which is carried out when the determination is made that it is a backlighted state is carried out only when an adjustment value of the diaphragm and/or the shutter speed at the exposure correcting means is a value which allows determination of whether the shooting environment is outdoors. Therefore, it is possible to prevent corrections which, in general, do not need to be carried out indoors where the necessity of backlight correction is low.

In conventional devices, proper backlight correction cannot be carried out. For example, when the main subject is at the vicinity of the center area, it sometimes cannot be determined that the subject is in a backlighted state even if it is in a backlighted state. In that case, the main subject is underexposed because proper exposure correction is not carried out. The present invention makes it possible to easily overcome this problem.

What is claimed is:

1. A camera device for performing a shooting operation by converting image light into an electrical signal using an image pickup device, the camera device comprising:

means for setting detection frames based on a division of an imaging surface of the image pickup device into a plurality of portions;

means for detecting the brightness level with every set detection frame;

means for calculating the ratio between the brightness level detected from the detection frame having the lowest detected brightness level and the average value of the brightness levels detected from the detection frames other than the detection frame having the lowest brightness level;

means for performing a weighting operation between brightness levels detected from a center detection frame and detection frames in the vicinity of the center detection frame and the brightness levels detected from the other detection frames, and exposure correcting means for performing an exposure correcting operation as a function of the brightness level of a detection frame;

wherein, when the obtained ratio is equal to or greater than a predetermined value, a backlighted state, is determined and a correcting operation is performed by limiting a high brightness component of the image signal as a function of the obtained ratio and the brightness level, and wherein when the detection frame having the highest detected brightness level is located at the center and the vicinity of the center of the imaging surface, the correcting operation carried out for a backlighted state is performed to a lesser degree by reducing the limiting operation of the high-brightness component of the detected brightness level.

* * * * *